United States Patent Office 3,070,420
Patented Dec. 25, 1962

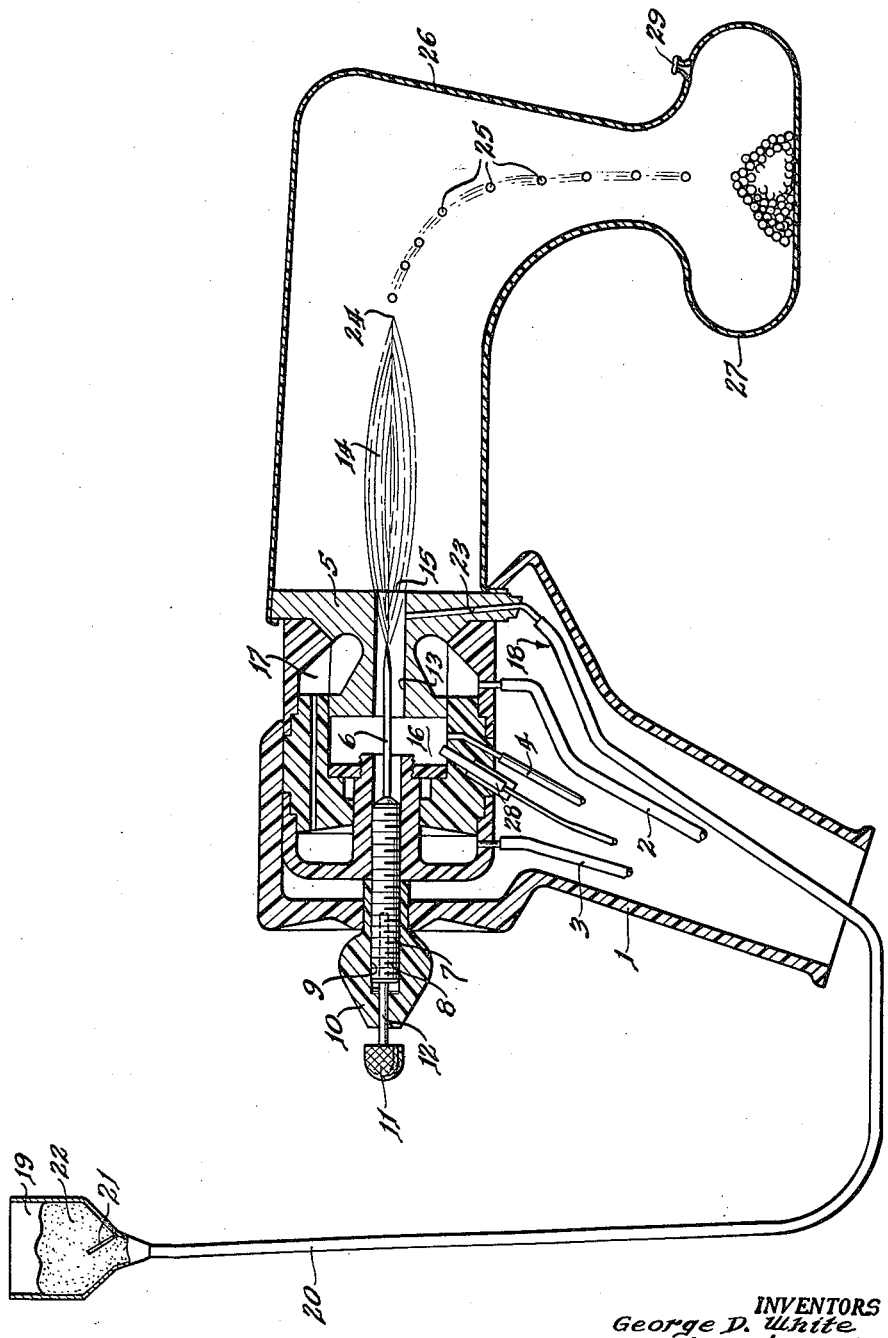

3,070,420
METHOD OF MAKING SPHERICAL ACTINIDE CARBIDE
George D. White, Joliet, and Dennis C. O'Rourke, Worth, Ill., assignors to the United States of America as represented by the United States Atomic Energy Commission
Filed July 28, 1961, Ser. No. 127,751
6 Claims. (Cl. 23—14.5)

The invention relates to a novel actinide carbide product and a method of making the same, more particularly to a product of substantially uniform and spherical non-pyrophoric uranium carbide particles suitable for use in a nuclear reactor, and a method for making such particles.

Actinide carbides, such as uranium carbide, plutonium carbide and thorium carbide, have properties to recommend them for nuclear reactor use. As compared to the metals, uranium, plutonium and thorium, their physical structure is far less susceptible to radiation damage; nor do they show the radiation growth which is a great shortcoming of metallic fuel and blanket materials. As compared to the oxides of the same metals the carbides have greater density, which permits their being used in reactor cores or blankets or more compact design than is possible when oxides are used.

The conversion of an actinide oxide to the corresponding carbide presents no difficulties of a theoretical kind; it is generally agreed to proceed according to a simple equation, the equation for the conversion of $UO_2$, which is typical, being as follows:

$$UO_2 + 3C \rightarrow UC + 2CO$$

Despite its apparent simplicity, the above reaction involves some very serious practical difficulties. It is not easy to drive the reaction to completion, so that some $UO_2$ often remains in the final product. This is serious in the case of nuclear reactors, where materials of very high purity are needed to meet the exacting requirements of reactor design.

In methods now known for carrying out the above reaction the particle size and shape of the carbide product varies considerably, and this is a drawback for reactor use. In general, these methods produce rather large masses that have to be crushed or otherwise reduced in size, and then screened to eliminate both oversize and undersize particles.

While the crushing and screening operations just described do result in a product of fairly uniform size, they do nothing to remedy the compositional non-uniformity due to the presence of unreacted $UO_2$, nor do they make the particles spherical. The operations are inherently expensive, and their expense is aggravated by the fact that the crushing operation necessarily produces some carbide fines, which are pyrophoric, and even after screening the larger particles tend to be dusty and have to be washed to eliminate the fines completely. Consequently, operations with those materials have to be carried out in an inert atmosphere, as in a glove-box.

Finally, all methods for making carbides of the class mentioned are comparatively slow and have to be carried out in batches, and therefore there are more expensive than a comparatively fast, continuous method.

It is, accordingly, an object of the invention to provide an actinide carbide product consisting of particles of substantially uniform size and spherical shape, substantially free of unreacted actinide oxide material, and stable due to the absence of pyrophoric fines and dustiness.

It is a more particular object of the invention to provide a uranium carbide product consisting of particles of substantially uniform size and spherical shape, substantially free of unreacted $UO_2$.

It is a further object of the invention to provide methods for producing the products of the preceding objects without the need for using a glove-box because of dustiness or the presence of pyrophoric fines.

It is a further object of the invention to provide methods for making actinide carbides in a continuous, comparatively fast manner.

Other objects will appear as the description proceeds.

All the foregoing objects are attained by our discovery that if the reaction of an actinide oxide and carbon is carried out in the environment of a heated inert gas within the temperature range of 10,000° to 13,000° C., substantially spherical particles of actinide carbide will be produced, of substantially uniform size and freedom from actinide oxide or other impurities. The sphericity of the particles reduces the surface area of the uranium carbide to a minimum, and thereby makes for a non-pyrophoric, stable product.

Only a fraction of a second is required to carry out the reaction in this environment, which environment may be secured from the operation of commercially available plasma-producing flame devices, or, as such devices are also called, a plasma gun, in which a stream of gas is heated by an electric discharge between two electrodes adjacent the gas stream.

Reference is now made to FIGURE 1 of the drawing which is a partly sectional view of a plasma flame-producing device with auxiliary receptacles for carrying out the invention. In the figure, 1 is the plastic frame of the plasma flame-producing device; 2 is a cooling water inlet connected to a water supply line (not shown); and 3 is a cooling water outlet connected to a water discharge line (not shown). 4 is the gas supply inlet connected to a gas supply line (not shown); the gas used for carrying out the invention is any inert gas such as argon, helium, or the like, argon being preferred. 5 is a front electrode of conductive material capable of withstanding high temperature, connected to a power circuit (not shown). 6 is the adjustable rear electrode connected to the same power circuit. It is joined at its rear end to rod 7 which has external threads 8 engaged in mating internal threads 9 of insulating knob 10. By rotation of adjusting knob 11, connected to rod 7 by rod 12, rear electrode 6 may be adjusted forward and backward within cylindrical discharge tunnel 13, thereby regulating the amount of the discharge between electrodes 5 and 6, which, in turn, affects the temperature of the tunnel 13 and the plasma flame 14 issuing therefrom through the orifice 15 within electrode 5. The other variable factor affecting the temperature is the rate of flow of the gas from chamber 16 through the tunnel 13. The cooling water flows through the surrounding water channel 17.

18 is the powder injection inlet connected to a hopper 19 by a powder line 20. Vibrator 21 causes powder 22, a mixture of actinide oxide and carbon, to flow from the hopper 19 through line 20 and passage 23 in electrode 5 so as to enter discharge tunnel 13 a short distance behind orifice 15. Flame 14 creates a suction, similar to the Venturi effect, which causes powder 22 to complete the passage from the hopper 19 into the tunnel 13, and on its arrival the flame 14 completely entrains the powder 22 within it and carries substantially all of it to its tip 24, from which issues a stream of the completely reacted, substantially uniform and spherical particles of the actinide carbide product of the invention 25. Duct 26 conducts particles 25 into receptacle 27, on the bottom of which particles 25 accumulate. Receptacle 27 also has an inert gas atmosphere, thereby preventing oxidation of the particles 25 to which they would otherwise be subject due to their elevated temperature.

28 is a starter, containing a capacitor, or similar device, for initiating the electrical discharge between electrodes 5 and 6. It is connected to the power circuit already mentioned. 29 is a one-way vent which permits excess gas within receptacle 27 to escape to the atmosphere.

In carrying out the invention the powder 22 is preferably prepared as follows. Fine carbon powder of less than 1 micron particle size is mixed in the stoichiometric proportions with actinide oxide powder such as $UO_2$ of from about 1 to 5 micron particle size. In the case of pure $UO_2$ this would be three moles to one, but since commercial $UO_2$ is slightly non-stoichiometric a small corresponding modification of this proportion should be made. The carbon may be any substantially pure carbon such as carbon black, channel black, and the like. The mixing preferably is carried out in a ball mill in alcohol for about two hours. Preferably a small amount such as 3% of organic binder such as carbowax is added prior to the mixing. The mixture is then removed from the ball mill, evaporated to partial dryness and the resulting cake is then pressed into small pellets such as cylinders half an inch in diameter and half an inch high, which are then crushed and sized by screening. Particles of —100 +200 mesh resulting from the screening are the preferred starting material for our powder 22. Of course, any other method of intimately mixing stoichiometric quantities of carbon and actinide oxide and which yields powder of operable particle size and flow characteristics may be used.

We have found the temperature of the plasma flame to be quite critical. It must be within the range of 10,000° to 13,000° C. to yield the particles with the desirable characteristics previously enumerated, i.e. substantial uniformity as to chemical composition and particle size, and of substantially spherical shape. The plasma flame through which the material passes should be from about 7 to about 10 inches long from the orifice 15 to the tip 24, preferably about 10 inches long, and the flow of inert gas such as argon into the plasma flame device should be from about 0.0014 to about 0.007 pound per second for a quarter-inch orifice. For some reason that is not completely understood, a minor amount of hydrogen, less than 1% by volume, added to the inert gas acts as a promoter and helps to drive the reaction between the carbon and the oxide to completion.

*Example*

12 grams of Thermax, a substantially pure carbon black of <1 micron particle size and 88 grams of commercial $UO_2$ of 1 to 5 micron particle size with 3% carbowax by weight were blended in alcohol in a ball mill for two hours. The resulting mixture was dried to the consistency of thick mortar, pressed into cylindrical pellets ½″ x ½″ and the pellets completely dried in an oven at 850° C. The pellets were crushed in a mortar and pestle, the resulting particles passed through a screen of 100 mesh, those not passing through being discarded, and then passed over a 200 mesh screen and the fines passing through discarded.

The —100 +200 mesh particles were then placed in a hopper in an apparatus of the type shown in FIGURE 1 and passed through an argon plasma flame 10 inches long at 13,000° C. through an orifice ¼″ in diameter. The argon flow into the plasma flame device was at the rate of about 0.0045 pound per second; the arc between the electrodes of the plasma flame device was on a three phase power circuit.

A mixture of substantially spherical particles of substantially pure UC was produced in the bottom of receptacle 27. Their particle size was essentially uniform, —120 +270 mesh. No fines were present and the particles were stable and non-pyrophoric in air.

It will be understood that this invention is not to be limited to the details given herein but that it may be modified within the scope of the appended claims.

What is claimed is:

1. A method of making a substantially uniform, non-pyrophoric mixture of substantially spherical, substantially pure actinide carbide particles, comprising mixing an actinide oxide with the stoichiometric amount of carbon required to convert the actinide oxide to the corresponding carbide, and passing the resulting mixture through an inert gas environment of 10,000° to 13,000° C.

2. A method of making a substantially uniform, non-pyrophoric mixture of substantially spherical, substantially pure uranium carbide particles, comprising mixing a uranium oxide with the stoichiometric amount of carbon required to convert it to uranium carbide, and passing the resulting mixture through an inert gas environment of 10,000° to 13,000° C.

3. A method of making a substantially uniform, non-pyrophoric mixture of substantially spherical, substantially pure uranium carbide particles, comprising mixing $UO_2$ with the stoichiometric amount of carbon required to convert the $UO_2$ to UC in a ball mill, molding the resulting mixture into pellets, crushing the pellets into particles, and passing the particles through a predominantly inert gas plasma flame at about 10,000° to 13,000° C.

4. A method of making substantially spherical, substantially pure, non-pyrophoric uranium carbide particles of —120 +270 mesh, comprising mixing commercial $UO_2$ with carbon black in the proportion by weight of about 22 to 3 in alcohol in a ball mill for about two hours, partially evaporating the alcohol and pressing the resulting mixture into pellets, crushing the pellets and sizing the resulting particles to about —100 +200 mesh, and passing the resulting sized particles through a predominantly inert gas plasma flame from about 7 to 10 inches long, the said flame having a temperature of from 10,000° to 13,000° C.

5. The method of claim 7 where the gas of the plasma flame includes up to 1% hydrogen by volume, and the balance is inert gas.

6. The method of claim 8 where the gas of the plasma flame includes 1% hydrogen by volume, and the balance is argon.

References Cited in the file of this patent

Murray: "2nd Geneva Conference—Peaceful Uses of Atomic Energy," vol. 6, page 549, September 1958.
ORO–212, page 2, September 15, 1959.
Accary: "Nuclear Power," vol. 5, No. 50, pp. 122, 123.
BMI–1442, pp. P–1, P–2 July 12, 1960.
C.&E. News, November 21, 1960, page 25.